HERMAN C. SCHEPLER
INVENTOR.

HERMAN C. SCHEPLER
INVENTOR.

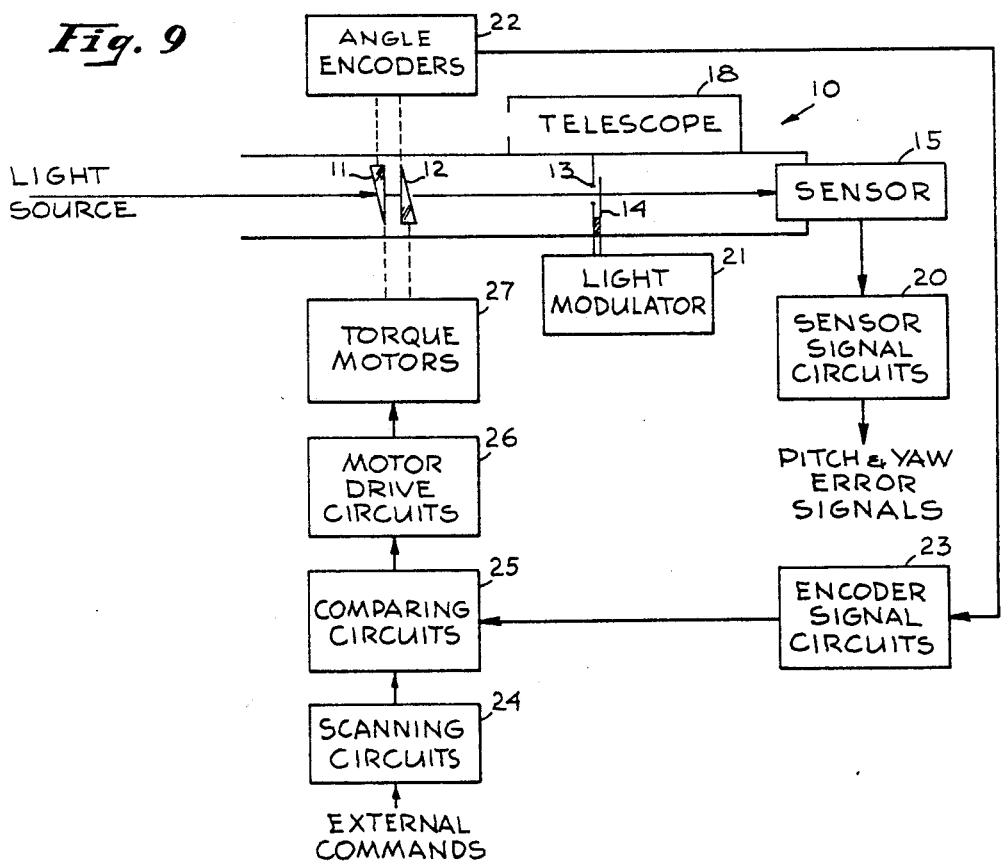
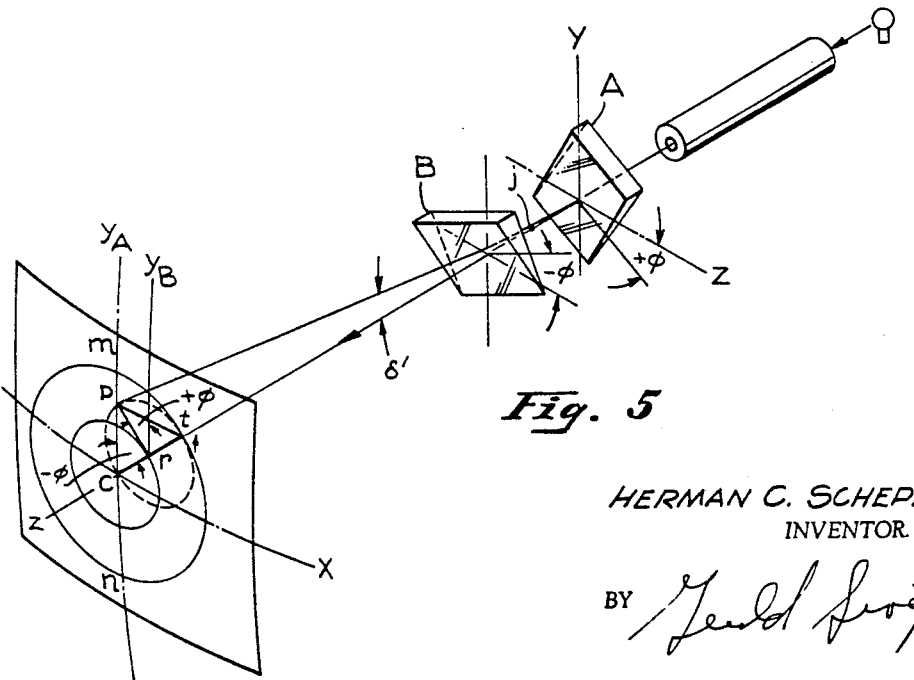

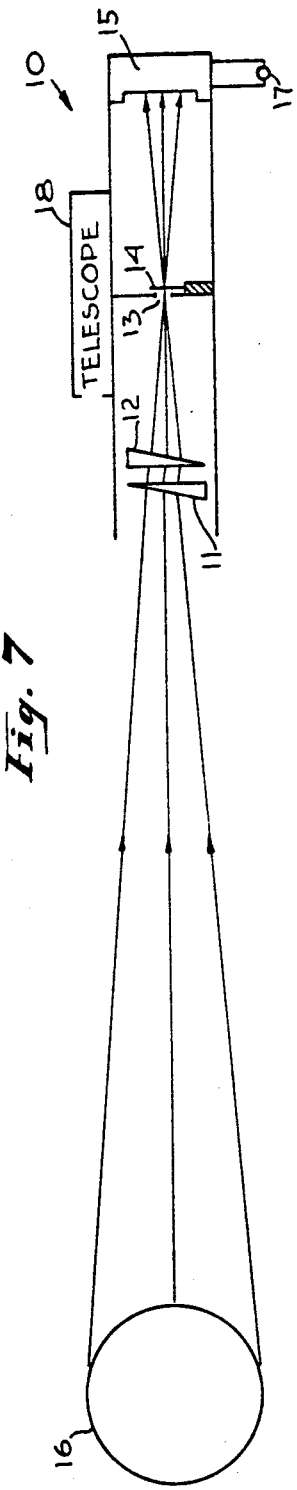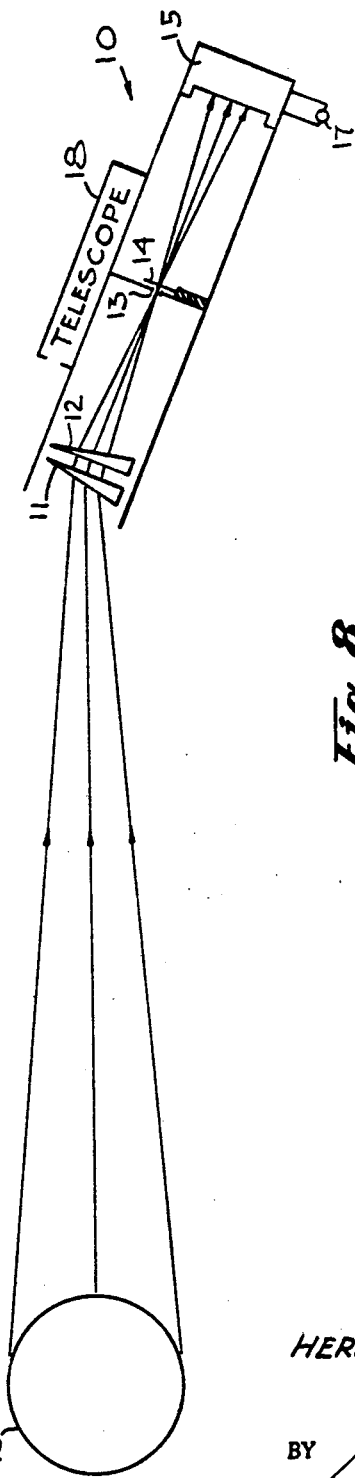

3,378,687
SCANNING SYSTEM WHICH OPTICALLY LOCKS ON OBJECT AND MECHANICALLY SCANS SURROUNDING FIELD
Herman C. Schepler, Torrance, Calif., assignor, by mesne assignments, to TRW Inc., a corporation of Ohio
Filed June 25, 1963, Ser. No. 290,367
6 Claims. (Cl. 250—203)

This invention relates to an optical scanning and aiming system and more particularly to an optical system for locking on a remote target and scanning an area relative to the target.

The prior art discloses well known techniques using optically responsive sensors for detecting, locking on and tracking a source of radiant energy. In such systems the source of energy is tracked relative to the observer and the accuracy of the optical alignment is at best only equal to the readout positioning accuracy.

In this invention an optical gain is realized in which the alignment accuracy is at least an order of magnitude greater than the positioning accuracy. In other words by using this invention it is now possible to aim a device with respect to a specified direction to an accuracy which is greater than the positioning accuracy available by at least a factor of 10. The improvement or gain of aiming accuracy over the available positioning accuracy is termed optical gain. As a result of the optical gain achieved it is possible to greatly simplify the electrical and mechanical functions and use ordinary state of the art readout devices for measuring the less critical positioning angle. The optical gain is achieved by precisely and accurately varying the line of sight of an angular aiming system by means of a pair of independently rotatable prisms located in the line of sight. The angular line of sight is originally established with the necessary precision to obtain the final accuracy desired which thereby allows the positional components to have at least one order of magnitude less precision than the final angular alignment achieved. In the preferred embodiment an optical detecting means is aligned with a pinhole aperture and positioned in the direction of the light source. A pair of independently rotatable prisms intersecting the light from the source are separately controlled to achieve the angular alignment desired. The optical angular alignment system may be used to align a telescope, a camera, a celestial body sensor or other similar devices.

In one system application for observing the sun, it is desired to lock on the sun by means of conventional optical devices and then scan areas within the field of view of the optical device. The scanned areas may include the sun, peripheral areas of the sun, and external areas around the sun. A telescope or other observatory means is aligned with and controlled as the optical scanning device is controlled, and preferably attached to the scanning device. With the prisms properly aligned and facing the sun a conventional servo system activated by the location of solar energy impinging on a radiation sensor controls and repositions the sensor to a null position indicated by the sun's disk falling on the axial center of the sensor. The servo system continually repositions the sun's disk on the center of the sensor thereby effectively maintaining the observatory and the sensor locked on the target which in this example is the sun. In the preferred embodiment a vibrating reed shutter located behind the pinhole aperture provides the sensor with signals suitable for AC amplification. Angle encoders and torque motors rotatably position the two prisms to produce the desired offset pointing or scanning of the surrounding area. Rotating the prisms deflect the solar image from the center of the sensor which is detected as a control system error signal that operates the attitude control system for servo reorienting the sensor and observatory to again bring the solar disk back to the center of the sensor. In this position the sensor system is locked on the sun; however the observatory is physically pointing in a different direction determined only by the amount of rotation of the prisms. By continuously rotating the prisms it is possible to scan the sun and surrounding area while the sensor remains continuously locked on the sun's disk.

Further objects and advantages will be made more apparent by refering now to the accompanying drawings wherein:

FIG. 5 illustrates the ray deviation resulting from rotating both prisms in opposing directions an angle $\phi$;

FIG. 7 illustrates an application of the invention in a sun sensing system;

FIG. 8 illustrates the repositioning or scanning effect resulting from the rotation of one of the prisms in the sun sensor system; and FIG. 9 is a block diagram of a sun sensor.

Figure 1:
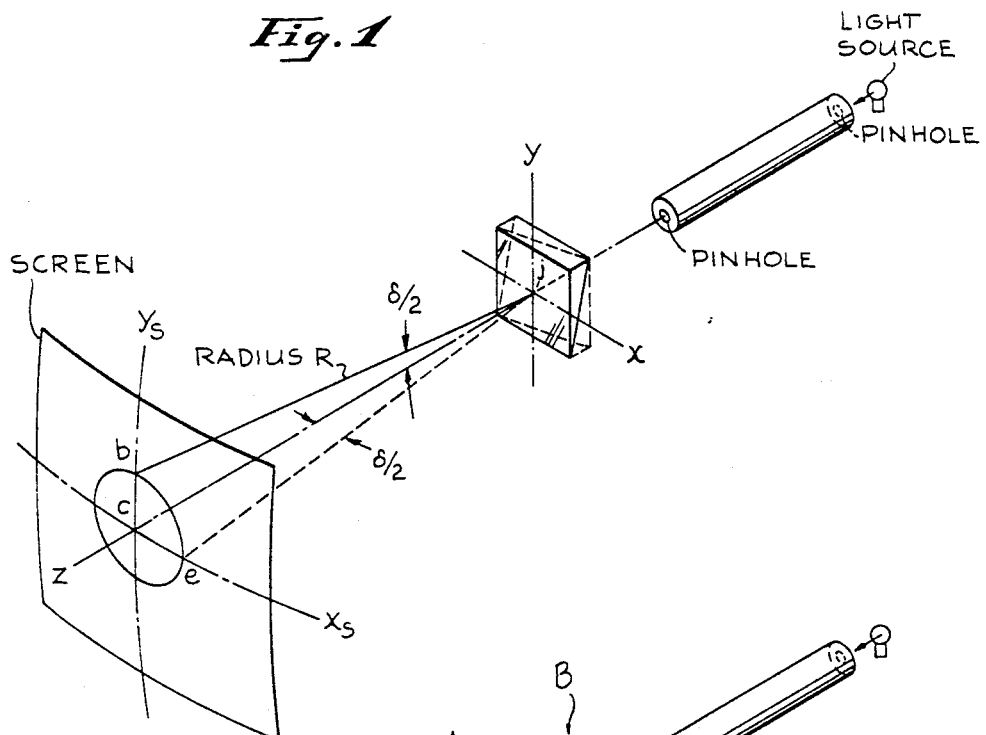
FIG. 1 illustrates the basic principle of ray deviation through a single prism and the effect of prism rotation.
Figure 2:
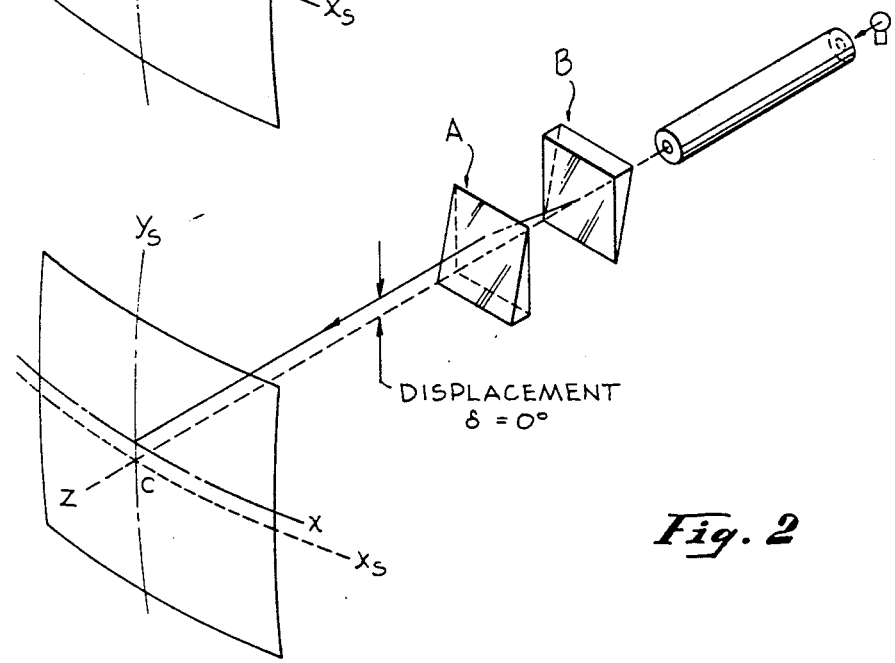
FIG. 2 illustrates the ray deviation through two prisms opposed.

Referring now to FIGS. 1-6, there is shown an $x$, $y$ and $z$ reference system in which a pair of prisms identified as A and B are located on the $z$ axis so as to rotate about the $z$ axis. In order to understand the functioning of the prisms A and B, consider the ray emanating from prism A in FIG. 1 as falling on a spherical screen of radius R from point $j$. Arc lengths on this screen are then measures of angles having their vertex at $j$. The center line through the screen always passes through this vertex thus obviating the parallel displacement of the center line due to deviation of the ray in traversing prisms A and B as shown in FIG. 2. For the sun scanning application (FIGS. 7 and 8) these arc lengths on the spherical screen represent angular deviations of the observatory from the center of the solar disk as the attitude control system operates to maintain the solar image at the center of the spherical screen 10 which is the sensor in the complete system.

Since light rays emating from the same distant point are considered parallel and the two prisms are located before the sensor pinhole aperture, the position of the sun's image on the sensor is sensitive to a deviation $\delta'$ through the prisms (refraction effects), but not to lateral displacement of a given ray.

A frame of reference is established by viewing the screen from the rear and measuring all angles clockwise as positive going angles and angles measured counterclockwise as negative going angles. (Referring particularly to FIG. 5.)

The equations relating attitude offset angles to prism rotation angles are:

$$\cos(\phi_A - \phi_B) = \frac{a_x^2 - 2nNa_x \sin^2(\alpha/2) - M}{2nP \sin^2(\alpha/2)(nN - a_x)\cos(\alpha/2)} \quad (1)$$

$$a_y \sin \phi_A + a_z \cos \phi_A = nP \sin(\alpha/2) \sin(\phi_A - \phi_B) \quad (2)$$

Where:
$n$ = index of refraction of prisms A and B
$\alpha/2$ = apex angle of each prism A and B
$\phi_A$ = angle of rotation of prism A from the $x$-axis
$\phi_B$ = angle of rotation of prism B from the $x$-axis $$M = (1-n^2 \cos^2(\alpha/2) + N^2 n^2 \cos \alpha$$
$$N = P \cos(\alpha/2) + 1/n$$

$$P = \sqrt{1 - \frac{\sin^2(\alpha/2)}{n^2} - \frac{\cos(\alpha/2)}{n}}$$

$a_x$, $a_y$, $a_z$ = direction cosines of desired sun vector and viewing axes $\delta/2$ = ray deviation angle through one prism, as through prism A in FIG. 1

Figure 4:
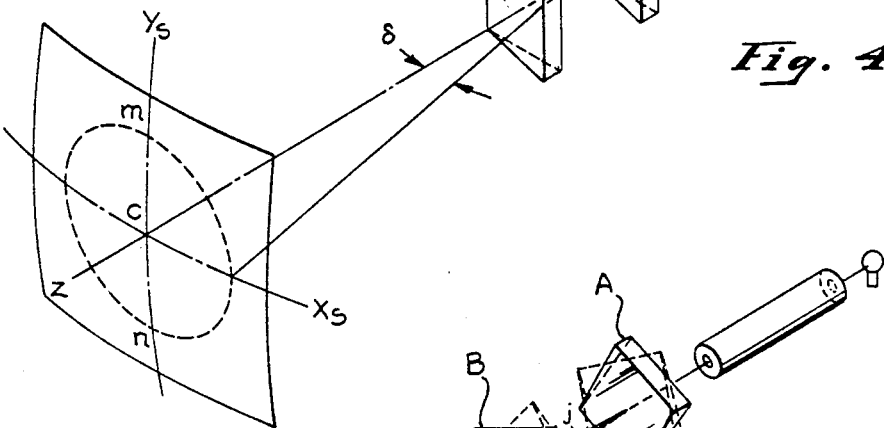
FIG. 4 illustrates the ray deviation through two prisms opposed and repositioned.

$\delta$ = ray deviation angle through two prisms identical, as through prisms A and B in FIG. 4

$\delta'$ = ray deviation angle through two prisms when in neither identical nor opposed rotational positions, as through prisms A and B in FIG. 5

$\omega$ = angle of rotation of prisms A and B as a unit (prisms A and B may already have $\phi_A$ and $\phi_B$ angles of rotation before angle of rotation is applied)

It should be noted that most of the terms in Equations 1 and 2 are constants. As indicated by Equation 1, the total deviation of the image ($\cos^{-1} a_x$) is affected only by the difference in prism angles. The computational procedure for determining the required prism angles for a given pitch and yaw deflection is to insert the desired direction cosines into Equation 1, and compute $\phi_A - \phi_B$. This value is then inserted into Equation 2 and $\phi_A$ is determined.

The function of the prisms can best be understood by referring now to FIG. 1 where there is shown a single prism A inserted at 0° rotational position before the pinhole for deflecting the central ray upward through an angle $\delta/2$. As prism A is rotated through 360°, the deviated ray traces a cone which appears as a circle on the spherical screen. $\delta/2$ is the angular deviation of prism A and arcs $\widehat{cb}$ and $\widehat{ce}$ are measures of angle $\delta/2$ on the screen.

Figure 3:
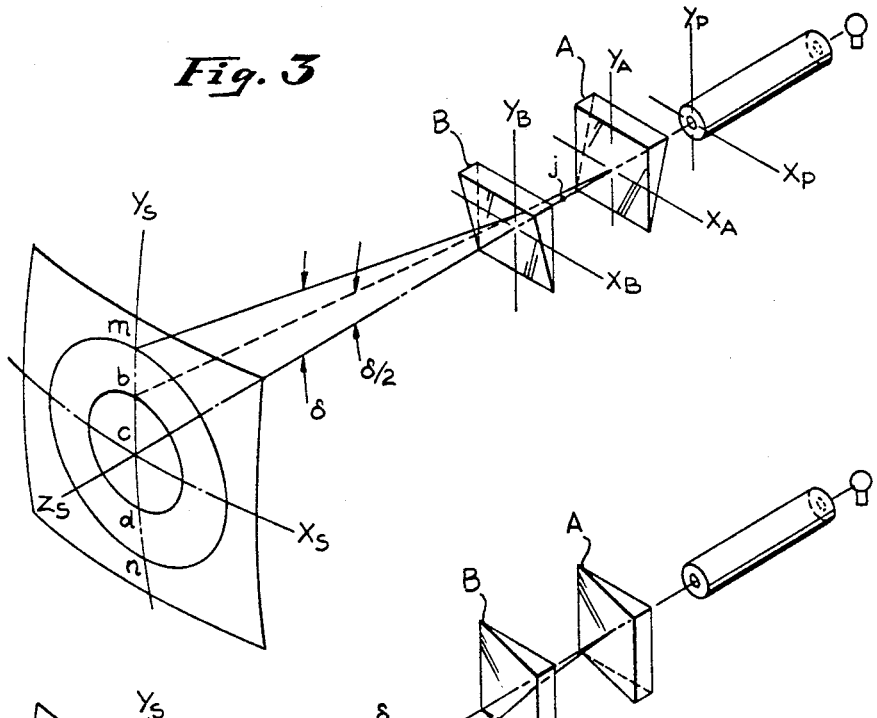
FIG. 3 illustrates the ray deviation through two prisms identical.

When a second prism B as illustrated in FIG. 3 is also inserted before the pinhole at 0° rotational position, the deviation of the refracted ray is almost double that achieved from using prism A alone. The effect will be considered to be double for purposes of describing prism rotations. In practice, the small discrepancy is compensated for in programing the prism rotations. $\delta$ is the deviation angle of both prisms when each is at 0° rotation and is a constant depending upon the charcteristics of the prisms and the angles the prism faces make with their axes of rotation. Arcs $\widehat{cm}$ and $\widehat{cn}$ on the screen are measures of $\delta$. The ray deviated angle $\delta$ traces the large (outer) circle when both prisms are rotated as a unit through 360°.

FIG. 2 illustrates the rotational position of prism A at 0° and that of prism B at 180°, the deviation through prism A being offset by that through prism B. The central ray emerging from the prisms is then parallel to but slightly displaced from the central ray incident upon prism A.

FIG. 5 shows prism A at $+\phi$ rotation and prism B at $-\phi$ rotation from their positions in FIG. 3. The deviated ray now intersects the screen at $p$. Thus, by contrarotation of the two prisms through such equal angular increments, the refracted ray can be swept in a plane scribing a straight line $\widehat{mn}$ on the screen. The deviated ray can be given any angular deviation $\delta'$ along $\widehat{mn}$ up to a maximum angle of $\delta$ by rotating prism A through $+\phi°$ and prism B through $-\phi°$. When using prisms A and B as positioned in FIG. 2 as their zero reference positions in rotation ($\delta'=0°$), the angular position of prism A is then ($\phi-90°$) and of prism B is then ($90-\phi°$). The relative angular rotation between prisms A and B is then ($180-2\phi°$).

Figure 6:
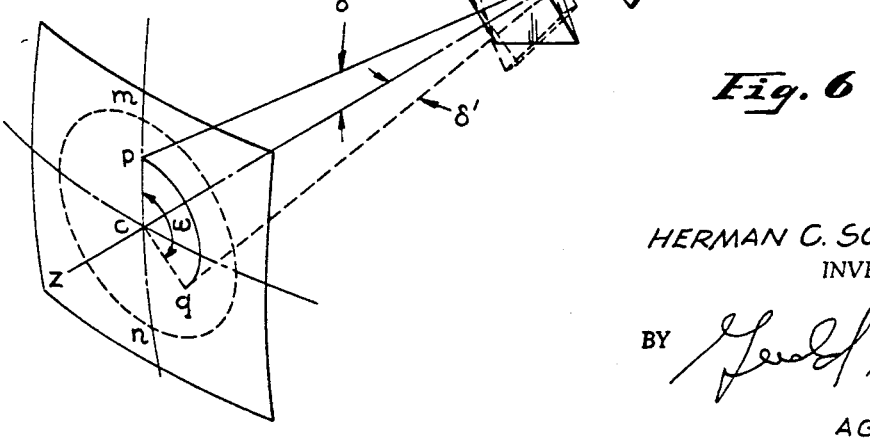
FIG. 6 illustrates the ray deviation resulting from rotating both prisms through an angle $\omega$.

As shown in FIG. 6, a ray is deviated to any point $q$, within the large circle of diameter $\widehat{mn}$ as follows: The radial arc $\widehat{cq}$ (which is a measure of angle $\delta'$) is set off as radial arc $\widehat{cp}$ and the central ray is deviated along line $\widehat{mn}$ to point $p$ with the prism contrarotation procedure just described. Then the deviated ray is rotated about point $c$ from $p$ to $q$ by rotating prisms A and B as a unit through angle $+\omega$. $\phi$ and $\delta'$ are related by the expression $\delta' = \delta \cos \phi$. The expression is derived as follows: The inner and outer (smaller and larger) concentric circles as shown in FIGURE 5 are the same as those previously described for FIGURE 3. Without prisms A and B, the central ray from the pinhole intersects the spherical screen at $c$. With prism A inserted and rotated angle $+\phi$, the deviated ray intersects the screen at $r$ in FIGURE 5. The ray $jr$, when deviated by prism B, scribes the dashed circle centered at $r$ when prism B is rotated 360°. When prism B is positioned to angle $-\phi$, the deviated ray intersects the screen at $p$ on line $\widehat{mn}$. $\widehat{rp}=\widehat{rc}=\widehat{rt}$ since they are radii of the same circle. $\widehat{cr} \cos \phi + \widehat{rp} \cos \phi = \widehat{cp} = \widehat{ct} \cos \phi$. $\widehat{ct}=\widehat{cm}$ and $\widehat{ct}$ is a measure of angle $\delta$. $\widehat{cp}$, FIGURE 5, is a measure of angle $\delta'$. Then, since $$\widehat{cp} = \widehat{ct} \cos \phi, \quad \delta' = \delta \cos \phi$$

K, the optical gain, is the rate of change of the contrarotation angle $\phi$ with respect to that of the ray deflection angle $\delta$, or $$K = \frac{d\phi}{d\delta'} = \frac{1}{\delta \sin \phi}$$

The gain is nonlinear with $\phi$ and is a minimum when $\phi = \pi/2$. This minimum value is equal to $1/\delta$. The optical gain K can be shown to vary inversely with $\delta$ for given values of $\phi$.

Referring now to FIGURES 7 and 8, there is illustrated a sun sensing application of the rotating prisms for causing a scanning motion while remaining locked on the energy source. The rotating prisms B and A have their adjoining faces (surfaces) parallel and perpendicular to their axis of rotation. This geometry dictates that a ray traversing prisms A and B is laterally displaced and not angularly deivated.

The sun sensing system illustrated in FIGURES 7 and 8 comprises an observatory 10 shown schematically as containing a pair of independently rotatable prisms 11 and 12 axially aligned with a pinhole aperture 13, a shutter 14 and an energy sensor 15. The observatory 10 is aimed at the center of the solar disk 16 by means of an attitude control system that is activated by solar energy impinging on a two-axis radiation sensor 15 maintained at null by a servo attitude control system 17. The sensor 15 receives a pinhole image of the sun's disk. A vibrating reed shutter 14 behind the pinhole aperture 13 provides output signals from the sensor 15 that are suitable for A-C amplification. Angle encoders and torque motors rotationally position the two prisms (wedges) 11 and 12 to produce offset pointing or scanning of the solar disk on the sensor 15. A telescope 18 or other utilizing device is attached to and moves as the observatory 10 moves. Rotation of the prisms 11 and 12 deflects the solar image from the center of the sensor 15, producing an attitude control system error signal for the servo 17 to thereby reorient the observatory and again bring the solar disk image back to the center of the sensor 15. The telescope 18 or other device controlled by the movement of the observatory 10 will therefore be pointed or scanned as a function of the rotation of the prisms 11 and 12.

The geometry of the prism positions described above also dictates that the central ray (from the radiation centroid of the solar disc) upon entering the pinhole aperture 13 is perpendicular to the adjoining parallel faces of prisms 11 and 12. The central ray images the center of the sun on the sensor 15. Since the sensor 15 and associated servo system 17 provide a null seeking device, this central ray provides a fixed reference direction that is specifically defined with respect to the prisms 11 and 12.

The sensor 15 contemplated for sun sensing application is a solid state photovoltaic device, operating in the visible through the near infrared spectrum and provides voltages representing two-axis deflections of an image from the null position. The incoming radiation is modulated by the vibrating reed shutter 14 to utilize A-C amplification and eliminate drift problems usually associated with D-C amplifiers. Suitable sensors are manufactured by Micro Systems, Inc., 319 Agostino Road, San Gabriel, Calif. The particular sensor 15 being manufactured is a silicon p-n junction device that makes use of photocurrent flowing parallel to the p-n junction rather than traversing the junction as in a silicon solar cell. The lateral photocurrents produce two lateral photovoltages between two pairs of electrodes mounted orthogonal to each other on the n-type material surface. The lateral photovoltages are a function of temperature and are proportional to the position of the center of gravity of the illuminated area and the incident radiant power. Thus, the device operates on the radiation centroid of the solar disc of received radiation and variations in image size having circular symmetry do not directly affect accuracy.

The expression for the photovoltage between one pair of terminals, when the illuminated area is contained in the linear region of the cell face and the incident radiant power is below saturation, is given by:

$$e_{ox} = K_1 P_t X_{cg} \qquad (3)$$

where $P_t$ = the total incident power
$K_1$ = constant for $P_t = 2$ mw.
$X_{cg}$ = center of gravity of incident power about the $y$ axis When $P_t = 2$ mw.
$e_{ox} = K X_{cg}$ where K is a constant.

The transverse photovoltage causes a current to flow in an external load across the junction. The transverse short circuit current is proportional to the incident radiant power when this power is below saturation and is a function of temperature, but it is independent of the radiation centroid of the solar disc of the incident radiation.

Referring now to FIG. 9 there is shown a block diagram of the sun sensor illustrated in FIGS. 7 and 8. The observatory basically comprises the optical mechanical assemblies for detecting the sun's disk and the auxiliary electronics for controlling the prisms. The observatory 10 is initially aligned with the energy source so that the sun's disk falls on the sensor 15. As mentioned previously the sensor 15 supplies two signals which are fed to a sensor signal circuit 20 which amplifies the signals to form control system error signals in two axes such as pitch and yaw. These error signals are the final output from the sun sensor system.

The light rays from the sun are caused to pass through the prisms 11 and 12, through the pinhole aperture 13 and the light chopper 14 before impinging on the sensor 15. The sun's disk is focussed on the sensor 15 by using simple pinhole optics which allow the sensor 15 to sense a change in the position of the sun's disk in two axes. Since the sensor 15 is always operated at null, the linearity of the sensor does not offset the over all system accuracy. An AC signal output is achieved by modulating the shutter 14 by a light modulator 21 such as the vibrating reed type. The angular offset pointing is accomplished by deflecting the sun's rays ahead of the pinhole operation 13 by rotating the two prisms 11 and 12 a preset or programmed number of degrees to obtain a given angular offset that can be captured by the field of view of the sensor 15. The actual rotational position of the prisms 11 and 12 is detected by an angle encoder 22 which may be of the "Theodosyn" type or by optically coded disks. The encoders 22 feed an encoder signal circuit 23 which generates electrical signals corresponding to the position of the prisms 11 and 12 and serve as the feedback signals for closing the prism drive loop circuits.

The pointing or scanning operation is controlled by a scanning circuit 24 which may operate either from internal programs or from external command signals which may be used to select stored programs. In any event an output signal from the scanning circuit 24 is fed to a comparing circuit 25 which also receives the feedback signal from the encoder signal circuit 23. A comparison between these two inputs will result in an error signal indicating the difference between where the prisms are and where they should be. This error signal is fed to a motor drive circuit 26 which controls the rotation of torque motors 27 that actually reposition the prisms 11 and 12.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
   pinpoint aperture means defining a mechanical axis having a preferred field of view for passing a focussed image of energy from said field of view along said mechanical axis,
   energy detecting means aligned with said aperture means for detecting said focussed image passing through said aperture means,
   a plurality of independently rotatable prisms optically aligned with said aperture means and said energy detecting means for intersecting said detected image and displacing said optical alignment, and
   means for scanning said mechanical axis with respect to said optical alignment by independently rotating each of said prisms.

2. In combination,
   aperture means defining a mechanical axis having a preferred field of view for passing a substantially small portion of energy from said field of view along said mechanical axis,
   energy detecting means aligned with said aperture means for detecting said energy passing through said aperture means,
   a plurality of independently rotatable prisms optically aligned with said aperture means and said energy detecting means for intersecting said detected energy and displacing said optical alignment,
   means for scanning said mechanical axis with respect to said optical alignment by independently rotating each of said prisms,
   and means cooperating with said rotating prisms for generating a signal indicative of the rotational angle of each of said prisms whereby the position of the scan is continuously determined.

3. In combination,
   aperture means defining a mechanical axis having a preferred field of view for passing a focussed image of energy from said field of view along said mechanical axis,
   energy detecting means aligned with said aperture means for detecting said focussed image of energy passing through said aperture means,
   means for generating signals indicative of the deviation of said focussed image of energy from a preferred location on said energy detecting means,
   means controlled by said signals for repositioning said energy detecting means whereby said focussed image of energy is maintained on said preferred location,
   a plurality of independently rotatable prisms optically aligned with said aperture means and said energy detecting means for intersecting said focussed image of energy and displacing said optical alignment, and
   means for scanning said mechanical axis relative to said optical axis by independently rotating each of said prisms to thereby scan said field of view.

4. In combination,
aperture means having a preferred field of view for passing a focussed image of energy from said field of view,
energy detecting means aligned with said aperture means for detecting said focussed image of energy passing through said aperture means,
means for generating signals connected to said energy detecting means indicative of the deviation of said focussed image of energy from a preferred location on said energy detecting means,
servo means in combination with said signal generating means and controlled by said signals for repositioning said energy detecting means whereby said focussed image of energy is maintained on said preferred location,
external observing means aligned with said energy detecting means and moved and controlled as said energy detecting means is controlled,
a plurality of independently rotatable prisms aligned with said aperture means and said light detecting means for intersecting said focussed image of energy, and
means for selectively and independently rotating each of said prisms whereby said observing means is caused to scan an area within said field of view while said energy detecting means remains locked on said focussed image of energy.

5. In combination,
aperture means having a preferred field of view for passing a focussed image of energy from said field of view,
energy detecting means aligned with said aperture means for detecting said focussed image of energy passing through said aperture means,
means for generating signals connected to said energy detecting means indicative of the deviation of said focussed image of energy from a preferred location on said energy detecting means, external observing means aligned with said energy detecting means and moved and controlled as said energy detecting means is moved,
means controlled by said signals for repositioning said observing means whereby said focussed image of energy is maintained on said preferred location of said energy detecting means,
a plurality of independently rotatable prisms aligned with said aperture means and said energy detecting means for intersecting said focussed image of energy, and
means for independently rotating each of said prisms thereby causing said observing means to scan said field of view while remaining locked on said focussed image of energy.

6. A sun sensing observatory comprising:
pinpoint aperture means defining a mechanical axis having a preferred field of view for passing a focussed image of the sun's disk from said field of view along said mechanical axis,
a light sensor detecting means aligned with said aperture means for detecting said focussed image of the sun's disk,
means for generating signals indicative of the deviation of the focussed image of the sun's disk from a central portion of said light sensor,
attitude positioning means controlled by said signals for repositioning said observatory whereby said focussed image of the sun's disk is maintained on said central portion of said sensor,
a plurality of independently rotatable prisms optically aligned with said aperture means and said light sensor for varying the optical alignment of said light sensor, and
means for independently rotating each of said prisms thereby causing said observatory to scan said field of view while said light sensor detecting means remains locked on the focussed image of the sun's disk.

References Cited

UNITED STATES PATENTS

| | | | |
|---|---|---|---|
| 2,870,671 | 1/1959 | Falconi | 250—236 |
| 2,923,202 | 2/1960 | Trimble | 250—203 X |
| 3,083,611 | 4/1963 | Ziolkowski et al. | 88—1 |
| 3,235,733 | 2/1966 | Dauquet | 250—203 |

FOREIGN PATENTS 1,271,551  8/1961  France.

OTHER REFERENCES

Whitford et al., "Photoelectric Guiding of Astronomical Telescopes," Review of Scientific Instruments, vol. 8, March 1937, pp. 78–82.

RALPH G. NILSON, *Primary Examiner.*

WALTER STOLWEIN, *Examiner.*

M. A. LEAVITT, *Assistant Examiner.*